Patented Apr. 20, 1943

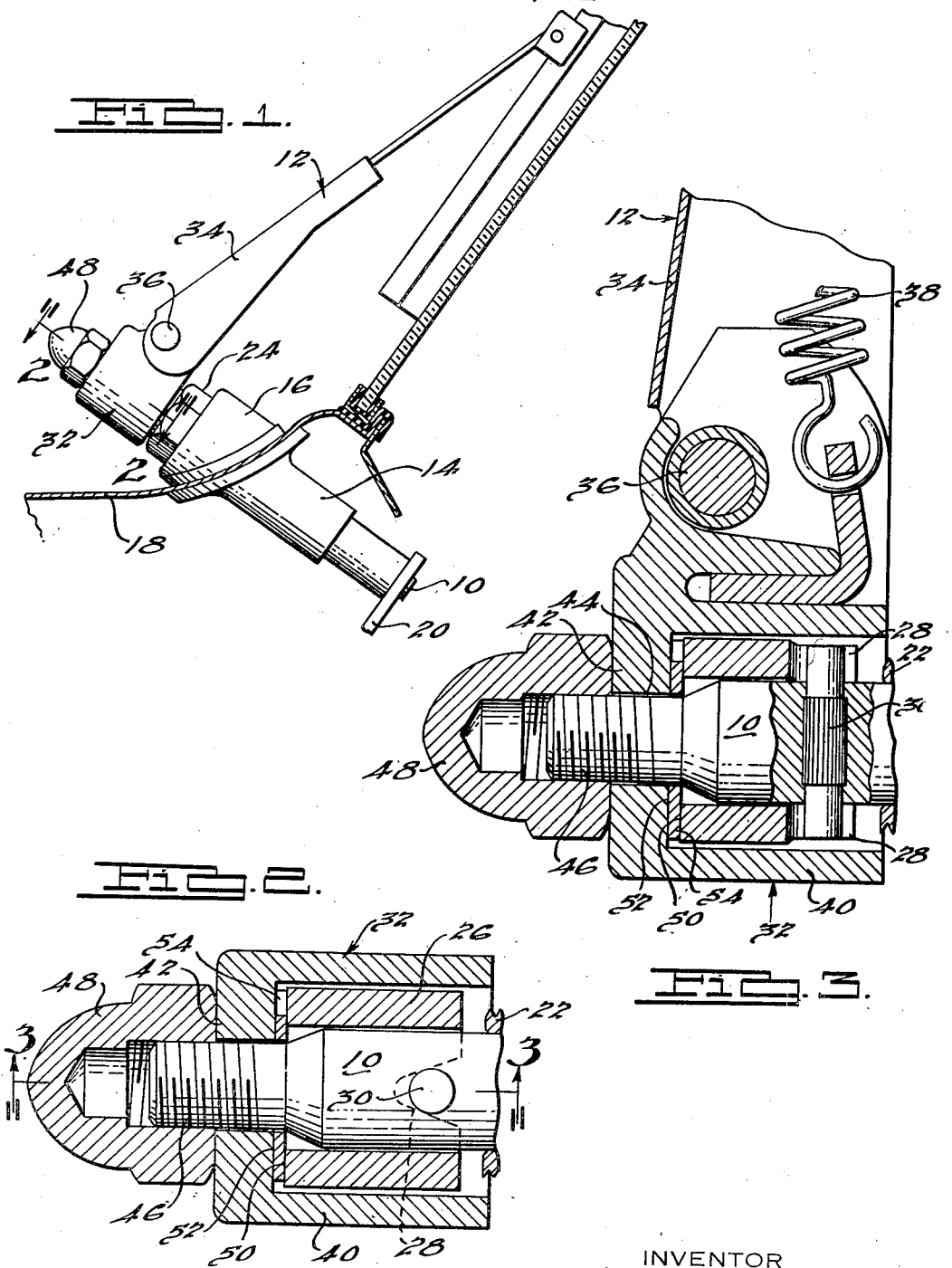

2,317,245

UNITED STATES PATENT OFFICE 2,317,245

WINDSHIELD WIPER MECHANISM

Rupert B. Bell, Ann Arbor, Mich., assignor to King-Seeley Corporation, Ann Arbor, Mich., a corporation of Michigan Application June 21, 1941, Serial No. 399,057

2 Claims. (Cl. 287—53)

The present invention relates to windshield wiper mechanisms and in particular is directed to an improved adjustable connection between a windshield wiper arm and an operating shaft associated therewith.

The principal objects of the present invention are to provide a connection of the above indicated character which is simple in construction, economical in manufacture and assembly, and which is efficient and reliable in operation; to provide such a connection characterized in that the wiper arm may be secured to the shaft in any desired relative rotative position, thereby making possible fine adjustments of the operating limits of the arm; to provide such a connection in which a coupling member is interposed between the arm and the shaft, which coupling member may be positively locked to the shaft and to which coupling member the arm may be frictionally locked; to provide such a connection wherein the coupling member presents a relatively large frictional holding surface for cooperation with the arm, and at the same time is constructed to interlock with a shaft of relatively small diameter; to provide such a connection wherein the upper end of the arm is of cup-shaped form, which cupped portion receives a collar which may be positively coupled to the shaft, and wherein means are provided to force the collar into frictional holding relation with the base of the cup-shaped portion so as to secure the arm to the shaft in a desired relative rotative position; and to generally simplify and improve connections of the above indicated type.

With the above as well as other objects in view, which appear in the following description and in the appended claims, a preferred but illustrative embodiment of the invention is shown in the accompanying drawing, throughout the several views of which corresponding reference characters are used to designate corresponding parts and in which:

Figure 1 is a view in vertical section through the cowl and windshield portions of a vehicle, showing, in elevation, a preferred embodiment of the invention;

Fig. 2 is a view in horizontal section, taken along the line 2—2 of Fig. 1; and

Fig. 3 is a view in section, taken along the line 3—3 of Fig. 2.

It will be appreciated from a complete understanding of the present invention that, in a generic sense, the improvements thereof may be embodied in structures intended for various different uses, and that various modifications may be made in the structural arrangement of the parts without departing from the spirit and scope of the invention. It is now preferred to utilize the invention to provide a readily adjustable and releasable driving connection between an oscillatable windshield wiper shaft and a wiper arm operated thereby and, in an illustrative but not in a limiting sense, the invention is so disclosed herein.

In Figure 1 of the drawing, an illustrative cowl mounting for a windshield wiper shaft 10 and an associated arm 12 is illustrated as comprising inner and outer bearing or swivel members 14 and 16. Members 14 and 16 are secured together and are positioned respectively at the inner and outer sides of the illustrative cowl 18, and may be suitably constructed, as will be understood, to give both axial and radial bearing support to the shaft 10, whereby the same may be oscillated to swing the wiper arm 12 through a desired range of wiping movements. Illustrative operating means for the shaft 10 are shown as comprising the crank 20, which, as will be understood, may be coupled to a suitable motor (not shown).

Referring particularly to Figs. 2 and 3, the outer end portion of the shaft 10 projects outwardly beyond a sleeve-like member 22, which may and preferably does form part of the inner bearing member 14 and which receives a holding nut 24. The wiper arm 12 is secured to the just-mentioned outwardly projecting portion of the wiper shaft 10, and as aforesaid, the present invention is directed particularly to the provision of an improved readily adjustable and releasable connection between the arm 12 and the shaft 10.

In accordance with the present invention, the adjustable connection comprises a coupling member, which is interposed between the arm 12 and the shaft 10. This coupling member is herein illustrated as a cylindrical sleeve or collar 26, which is loosely fitted over the end of the shaft 10. In order to provide a releasable but positive nonrotative connection between the shaft 10 and the coupling member 26, the coupling member 26 is provided with diametrically opposite similar notches 28, and the shaft 10 is provided with a drive pin 30, the ends whereof project radially outwardly beyond the periphery of the shaft 10 and, in the assembled position of the parts, are received in the respective notches 28. Preferably and as illustrated, the sides of the notches 28 are divergent, so as to positively eliminate play between the pin 30 and the collar 26 when the parts are in the fully assembled position.

The arm 12 comprises an end or connecting portion 32 and a blade carrying portion 34, which are pivotally connected together by means of a pin 36, as will be understood. Also, the blade carrying portion 34 is continuously urged in a clockwise direction relative to the connecting part 32 by means of a tension spring 38, the ends of which are connected respectively to the portions 32 and 34.

The connecting portion 32 also comprises a cup-shaped housing part which may and preferably does have a continuous cylindrical wall 40 and a base 42. The base 42 is provided with an aperture 44, which loosely passes the outer reduced end 46 of the shaft 10. As clearly appears in Figs. 2 and 3, the collar 26 is wholly received within the cup-shaped portion defined by the wall 40 and the base 42, and except when the hereinafter described holding nut is tightened, the cup-shaped portion is freely rotatable around the collar 26. The outer end 50 of the collar 26 is formed as a flat annular surface, and the inner surface 52 of the base 42 is also formed as a flat frictional holding surface. Preferably and as illustrated, a suitable means such as a lock washer 54 is interposed between the surfaces 50 and 52.

As will be understood, if the nut 48 is turned onto the shaft 10, it forces the arm 12 axially along the shaft and ultimately causes the surfaces 50 and 52 to frictionally engage the washer 54. This engagement brings the surfaces 50 and 52 into what is referred to in certain of the claims as a frictional holding relation, and completes a frictional non-rotative connection between the collar 26 and the arm 12. The axial force exerted by the nut 48 also wedges the pin 30 into the bases of the notches 28, and completes a positive non-rotative connection between the shaft 10 and the collar 26. Upon release of the nut 48, the arm 12 may freely be turned to any desired rotative position relative to the collar 26 and the shaft 10, it being understood that the present frictional holding relation affords an extremely fine range of adjustment of the arm.

Various advantages of the present construction will be apparent to those skilled in the art, in addition to the above-mentioned important advantage of providing a fine range of adjustment of the arm. A further illustrative advantage is that the use of the intermediate coupling member makes it possible to provide a relatively large area of frictional holding engagement between the arm and the coupling member, while at the same time making it possible to use a shaft 10 of relatively small diameter.

Although only a single specific embodiment of the invention has been described in detail, it will be appreciated, as aforesaid, that various modifications in the form, number and arrangement of parts may be made without departing from the spirit and scope of the invention.

What is claimed is:

1. In a connection between a shaft member and an arm carried thereby and adapted to swing in a plane transverse to the axis of the shaft, the combination of a sleeve-like coupling member through which said shaft member passes, interlocking means carried in part at one end of said coupling member and in part on said shaft for forming a releasable but positive non-rotative connection between the coupling member and shaft, said means including means defining a notch, provided with walls, in one of said members, and a radially projecting part, disposed to be received in said notch and wedged between said walls, on the other member, the other end of said coupling member being formed as a frictional holding surface, said arm having a cup-shaped housing portion through the base of which said shaft projects, said coupling member being received in said cup-shaped portion and the base of said cup-shaped portion constituting a frictional holding surface for cooperation with said first-mentioned frictional holding surface, and means comprising holding means carried by said shaft and advanceable therealong to apply pressure between said holding surfaces so as to prevent rotation of said arm relative to said coupling member and for retaining said interlocking means in assembled relation to each other.

2. In a connection between a shaft and an arm carried thereby and adapted to swing in a plane transverse to the axis of the shaft, the combination of a collar fitted over said shaft, one end of said collar having at least one notch therein which extends parallel to the axis of the collar and has side walls, said shaft having shoulder means projecting radially therefrom for reception in said notch in wedged relation between said side walls, said means and side walls when so wedged acting to form a releasable but positive non-rotative connection between the collar and shaft, the other end of said collar being formed as a holding surface, the end of the arm being of cup-shaped form having an apertured base through which the end of the shaft projects, the inner surface of the base constituting a holding surface, said collar being received in said cup-shaped portion of the arm and the holding surface on the collar being in juxtaposed relation, and means comprising a holding member removably secured to the outer end of the shaft and advanceable therealong to apply pressure between said surfaces whereby to lock said arm against rotation relative to said collar and to force said shoulder means into said notch so as to hold said collar in non-rotative relation to the shaft.

RUPERT B. BELL.